Jan. 31, 1967  J. M. WITTKE  3,301,444
AEROSOL METERING VALVE
Filed Aug. 12, 1965
FIG. 1.
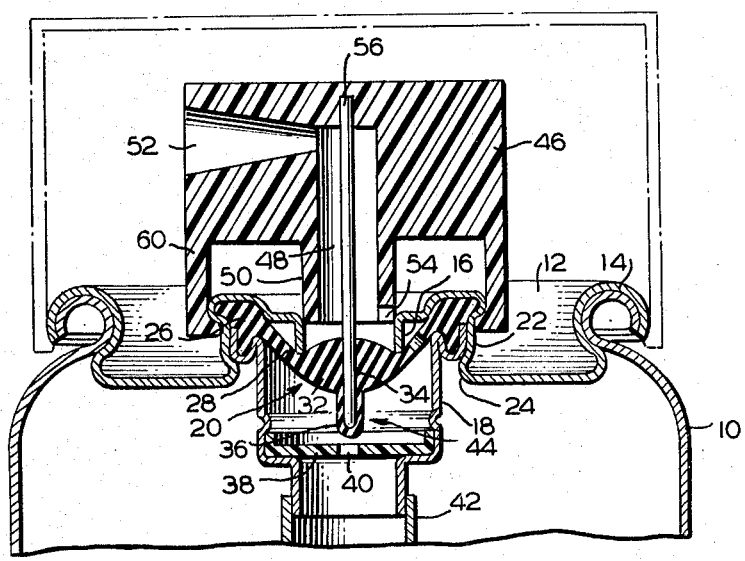
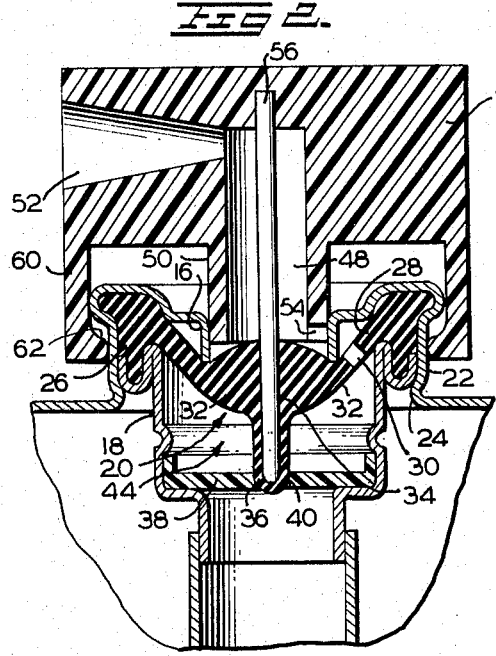
FIG. 2.
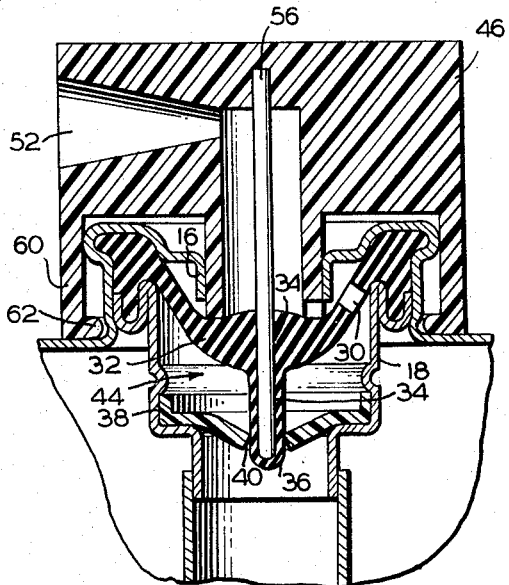
FIG. 3.
INVENTOR
JOHN M. WITTKE
BY *Rowe & Rowe*
ATTORNEYS ём
United States Patent Office 3,301,444
Patented Jan. 31, 1967

3,301,444
AEROSOL METERING VALVE
John M. Wittke, Westfield, N.J., assignor to Oel Inc., Elizabeth, N.J., a corporation of New Jersey
Filed Aug. 12, 1965, Ser. No. 479,070
11 Claims. (Cl. 222—402.20)

This invention relates to a metering valve construction for a pressurized dispenser such as an aerosol, and more particularly to a unique valve construction employing a minimum of parts which are inexpensively fabricated and assembled to provide a reliable dispensing valve for discharging a predetermined measured dose of product upon each actuation of the valve.

With widening consumer acceptance of and preference for pressurized aerosol-type product dispensers, there is an increasing need for a simple and inexpensive valve structure therefor which will reliably discharge measured doses of product from the container. While the manufacture of non-metering, continuous flow dispensing valves has reached a rather high degree of refinement in the aerosol packaging industry, somewhat less attention has been directed to the development of metering valves for use on these packages, which heretofore have been unduly complex, required close manufacturing tolerances, and have been difficult to fabricate and assemble economically on a mass production basis.

It is therefore a principal object of the present invention to provide a metering valve for a pressurized dispenser which is characterized by its simplicity of construction with a minimum of components, yet which is reliable in operation.

It is another object of the invention to provide a metering valve utilizing a single resilient element having relatively and differentially movable portions serving respectively as the principal discharge-controlling valve and also as the measuring chamber metering inlet valve.

It is another important object of the invention to provide a metering valve for an aerosol container employing only three cooperative elements, thereby materially simplifying fabrication thereof and avoiding the complex assembly steps required for present metering valve constructions by virtue of their multiplicity of elements which require excessive care in assembly to insure proper fit and operation of the valve unit.

Other objects and advantages of the present invention will become apparent from the following detailed description taken in connection with the accompanying drawings, in which:

FIG. 1 is a sectional elevation of the instant metering valve assembly as associated with the upper portion of a representative container;

FIG. 2 is a view similar to FIG. 1 and illustrates an intermediate position of the valve during actuation thereof; and FIG. 3 is a view similar to FIG. 1 illustrating the valve fully opened for dispensing of the metered charge from the container.

Referring to the drawings, there is shown at 10 a representative container adapted to receive a product under pressure, as for example an aerosol mixture of propellant and product. An end closure 12 is secured to the container 10 in any usual fashion, as by means of a roll seam 14. The member 12 is provided with a central discharge aperture in the form of a depending annular flange 16, the lower end of which serves as a valve seat. Cooperating with the end closure 12 in conventional fashion is a peripherally flanged cup-like member 18 for mounting the dual valve element 20. In the illustrated embodiment, the cup 18 is supported beneath closure 12 and within an upstanding annular wall 22 thereof as by means of inwardly deformed wall portions 24.

Valve 20 is molded from resilient material such as rubber and includes an annular rim 26 which is securely gripped between and forms a seal with the adjacent portions of closure 12 and the peripheral flange of cup member 18. Extending inwardly from valve rim portion 26 is a somewhat thinner stretchable annular web portion 28 provided with one or more apertures 30.

The valve element 20 further includes a central thickened button 32, the upper surface of which forms a seal with the depending flange 16 of end closure 12, the surrounding web 28 being normally downwardly stretched by flange 16 to maintain the button 32 in normally tightly sealed relation with the flange 16. To the extent so far described, the valve 20 as well as the cooperating mounting and container portions associated therewith are substantially conventional in nature, being similar to that shown, for example, in Patent 3,101,876.

In the present invention, however, the valve 20 is molded with a central aperture or bore at 34, the button 32 along its lower surface merging into a thin-walled depending tail portion 36 which is closed at its lower end. The wall of valve portion 36 is considerably thinner than button 32 or the web 28 of valve 20, so as to be differentially stretchable and axially elongatable far more readily than the remainder of valve element 20 to serve as an inlet metering valve as described hereinafter.

Frictionally seated within the lower end of cup 18 upon an inturned annular flange thereof is a resilient disc 38 of polyethylene or similar material, which is centrally apertured at 40 in axial alignment with the depending tail portion 36 of valve 20. The aperture 40 forms an inlet passageway in normal communication with the interior of container 10 through conventional dip tube 42 depending from cup 18, and a chamber 44 of predetermined volume defined between the disc 38, cup 18, and the undersurface of member 12.

Associated with the dual valve 20 is an actuator 46 conveniently molded from plastic material which includes a central dispensing bore 48 defined by a relatively rigid depending discharge valve actuator skirt 50, the upper end of bore 48 merging into a lateral discharge spout 52 in substantially conventional fashion. The depending skirt 50 is notched at 54 to provide a lateral inlet port thereinto when the skirt 50 unseats button 32 of valve element 20, and the skirt 50 is dimensioned for a snug sliding fit within discharge passageway wall 16.

Carried by actuator 46 axially centrally of bore 48 is a rigid depending inlet valve actuator rod 56. The upper end of rod 56 is fixedly embedded in actuator 46 and extends downwardly through bore 48 and loosely into valve button aperture 34 to terminate in a rounded or blunted lower end adjacent the closed end wall of depending tail valve portion 36. In lieu of a rod member 56 of metal or the like which is fixedly secured in the cap 46, the rod 56 may be integrally molded with the cap to compromise a depending plastic rod.

The actuator 46 further includes an outer depending skirt 60 which is provided with a lower inturned shoulder 62 loosely snap fitted over and around radially projecting portion of closure 12, whereby actuator 46 is capable of limited axial movement on the container between the positions shown in FIGS. 1 and 3. The container may be provided with a conventional protective overcap snap fitted thereupon, as illustrated in dashed lines, FIG. 1.

In operation, it will be seen that prior to use, metering chamber 44 is in normal communication with the interior of container 10 through port 40 of resilient disc 38, while the upper surface of valve button 32 forms a primary discharge valve seated tightly against depending flange 16 of end closure 12 to prevent discharge of the container contents through bores 48, 52.

Upon initial manual depression of actuator cap 46 to the FIG. 2 position, however, it will be seen that the valve tail portion 36 becomes elongated while the remainder of dual valve element 20 of thicker, relatively less resilient rubber or like material remains in its FIG. 1 position. Downward stretching of tail portion 36 is effected by rod 56 as the actuator 46 is initially moved downwardly, and causes the stretched inlet valve tail portion 36 to enter and frictionally engage within aperture 40 of disc 38 as seen in FIG. 2, thereby sealing chamber 44 from communication with the interior of the container 10 and accordingly trapping a predetermined pressurized charge of product within the chamber 44.

Continued downward axial movement of actuator 46 causes the assembly to assume the position shown in FIG. 3 wherein disc 38 flexes as actuator rod 56 continues to move downwardly, thereby maintaining the inlet valve seal against the container contents, while skirt 50 of the actuator will thence engage the valve button 32 to unseat the same from depending flange 16. Accordingly, the trapped charge of predetermined volume contained within chamber 44 will flow through web apertures 30 of valve 20, beneath flange 16, through one or more lateral ports 54 in the skirt 50, thence upwardly through passageway 48 and laterally outwardly through discharge spout 52 of the actuator, thereby expelling only the measured dosage contained within chamber 44.

Upon release of actuator cap 46, the tension in valve web 28 will initially restore the valve 20 to the FIG. 2 position, with valve button 32 seated against depending flange 16 to close the discharge passageway, while tail valve portion 36 remains in extended sealed relation with aperture 40 in disc 38, thereby preventing any loss or further discharge of the container contents to the atmosphere. Further upward movement of actuator cap 46 will then restore the assembly to the FIG. 1 position as the tension in stretched tailpiece portion 36 of valve 20 elevates rod 56 and thereby cap 46 to the normal position with chamber inlet aperture 40 re-opened, permitting the container contents to be reintroduced into measuring chamber 44 prior to subsequent dispensing of another measured dosage.

From the foregoing it will be seen that the instant metering valve is simple and effective in operation and uniquely combines in a single resilient valve member 20 both a primary discharge valve between depending flange 16 and the upper surface of button 32, as well as a metering chamber inlet control valve provided by depending thin-walled stretchable tailpiece portion 36 which partakes of movement relative to the button 32 in cooperating with disc aperture 40 as aforesaid.

While for clarity of illustration the tail portion 36 of valve 20 is illustrated as of substantial thickness, it will be appreciated that in actual manufacture the wall of the tubular projection is quite thin so as to be readily extensible or stretchable relative to the button 32 or web 28. Thus, in one specific form of the novel valve 20, the wall thickness of tubular portion 36 is on the order of .015", as compared to a thickness of .045" at web 28.

Further, while in the illustrated embodiment of the invention actuator 46 is shown as being generally cylindrical and as being releasably retained upon the end closure 12 which also serves as a mounting member for the entire valve assembly in attaching the same to a container, it will be understood that the actuator 46 may partake of a variety of configurations or may be cooperably associated with member 12 in various ways known in the art. Further actuator 46 may be completely detached from any normal association with the valve assembly prior to use, as may be desirable for medical or sanitary reasons by the use of throwaway single use actuators, for example.

While an exemplary operative form of the invention has been illustrated and described, the simplified valve assembly may otherwise be modified in appearance or mode of employment without departing from the spirit and scope of the invention as defined in the claims.

What is claimed is:

1. An aerosol dispenser valve assembly having a metering chamber provided with spaced inlet and outlet ports,
   a resilient valve member mounted within said chamber for controlling flow through said ports,
   said valve member having integrally formed first and second portions, with said first portion disposed in normally tensioned sealing relation to said outlet port, and said second portion disposed in normally spaced relation to said inlet port,
   said second portion having the characteristic of being readily stretchable relative to said first portion,
   and an actuater movably carried by said valve assembly,
   said actuator having a first element disposed in spaced relation to said first valve portion and having a second element disposed closely adjacent said second valve portion,
   whereby upon initial movement of said actuator said second element engages and stretches said second valve portion relative to said first valve portion into sealed relation with said inlet port and upon further actuator movement said first element engages said first valve portion to open said outlet port while said second element holds said second valve portion in sealed relation with said inlet port.

2. The valve assembly of claim 1 wherein said valve portions and said actuator elements are respectively concentric, with said second valve portion and said second actuator element respectively innermost.

3. The valve assembly of claim 1 wherein said actuator elements are mounted for movement through said chamber outlet port.

4. The valve assembly of claim 1 wherein said first valve portion comprises a thickened button-like member and said second valve portion comprises a thin-walled closed-end tubular projection extending axially from said button-like member, said button-like member being apertured to communicate with the interior of said tubular projection, and wherein said actuator first element is disposed to engage said button-like member and said actuator second element is disposed to engage said tubular projection.

5. The valve assembly of claim 4 wherein said first actuator element comprises a tubular sleeve annularly engageable with said button-like member and said second element comprises a rod normally extending through said sleeve and through said button-like member aperture into adjacent relation with the closed end of said tubular projection.

6. A metering valve assembly for an aerosol dispenser comprising,
   means defining a metering chamber having spaced inlet and outlet ports,
   a one-piece resilient valve element mounted in said chamber and having spaced integrally formed portions resiliently connected for limited relative movement for controlling flow respectively through said inlet and outlet ports, with one said portion normally closing said outlet port and the other said portion normally in spaced relation to said inlet port,
   and means for moving said other portion relative to said one portion by stretching said connection between said portions to close said inlet port and thereafter for moving said portions in unison for opening said outlet portion while maintaining said inlet port closed.

7. A metering valve assembly comprising:
an annular supporting member for attachment to the open end of a container, said member including a central depending annular flange defining a discharge outlet,
a cup-like element carried by and beneath said support flange, said element having means providing an apertured resilient lower wall defining an inlet port,
said supporting member and cup-like element together defining a ported measuring chamber,
a resilient valve member carried by said supporting member and said cup-like element and including an apertured annular portion in normally tensioned sealing relation with said depending flange to seal said discharge outlet,
said valve member further including a central bore therethrough and having a resilient thin-walled closed-end axially depending tail portion in surrounding relation to said bore,
said tail portion being disposed in normally spaced relation to said inlet port,
and means for stretching said tail portion into sealing relation with said inlet port while said valve member annular portion remains in tensioned sealed relation with said discharge outlet, and for thereafter unseating said annular portion from said discharge outlet while said tail portion flexes said resilient wall to maintain said inlet port sealed.

8. A metering valve assembly for an aerosol dispenser comprising:
mounting means for attachment to the dispenser,
means cooperatively associated with said mounting means defining a metering chamber having an inlet port through which the chamber is refilled and an outlet port through which the chamber contents are discharged,
a resilient one-piece valve element cooperatively associated with said metering chamber, said element having an apertured first portion disposed in normally sealed relation to said chamber outlet port and having a second portion in normally spaced relation to said chamber inlet port, said portions being resiliently connected,
and actuator means for said valve element, said actuator means including a pair of portions adapted for respective successive engagement with said valve portions, whereby upon movement of said actuator said resilient connection is stretched causing said valve second portion to close said chamber inlet prior to engagement of said valve first portion to open said outlet port.

9. In an aerosol valve assembly including a mounting member for attachment to a container and having a central discharge port therethrough defined by a depending annular flange; a resilient disk-like valve member including a peripheral rim, an apertured intermediate annular web, and a central button; an annular cup-like member associated with said mounting member therebeneath to sealingly retain said valve rim therebetween and dispose said valve button in normally tensioned sealing relation to said depending central flange, with the lower end of said cup-like member open for communication with the interior of the container when said assembly is attached thereto; and an actuator movably carried by said mounting member and having a central annular sleeve portion disposed in normally spaced relation to said button and reciprocable within said annular flange for stretching said web and dislodging said valve button to open said discharge port upon downward movement thereof,
the improvement whereby said valve assembly is capable of dispensing measured charges comprising:
a depending thin-walled tail portion integrally formed with and depending from said valve button and terminating in a closed lower end,
an aperture through said valve button communicating with the interior of said tail portion,
a resilient disk carried by and closing the lower end of said cup-like member disposed in spaced relation to and beneath said valve tail portion, said disk having an aperture therethrough defining an outlet port in alignment with said valve tail portion,
and a depending rod carried by said actuator disposed centrally of said sleeve and extending through said button aperture into proximity to said closed tail portion
whereby, upon initial downward movement of said actuator, said rod engages and stretches said thin-walled tail portion independently of the remainder of said valve element to insert said tail portion into sealing relation with said disk aperture, and further downward movement of said actuator serving to flex said disk while maintaining said aperture thereof sealed as said actuator sleeve engages said button to open said discharge port.

10. A one-piece valve element for use in a metering valve assembly comprising a peripheral rim, an intermediate annular web extending radially inwardly from said rim and having an aperture therethrough, a central thickened button-like portion, and a relatively small diameter thin-walled hollow tubular projection extending axially outwardly from said button centrally thereof and having a closed terminal end, said button-like portion having a central aperture therethrough communicating with the interior of said tubular projection.

11. The valve element of claim 10 wherein the wall of said tubular projection has a thickness less than one-half the thickness of said annular web.

References Cited by the Examiner

UNITED STATES PATENTS

| | | | |
|---|---|---|---|
| 2,861,723 | 11/1958 | Cooksley | 222—394 |
| 3,073,489 | 1/1963 | Friedman | 222—394 |
| 3,101,876 | 8/1963 | Ayres | 239—579 X |
| 3,123,261 | 3/1964 | Gorman | 222—394 |
| 3,138,304 | 6/1964 | Raehs | 222—394 |
| 3,186,605 | 6/1965 | Potoczky | 222—394 |
| 3,231,150 | 1/1966 | Holm et al. | 239—350 X |

RAPHAEL M. LUPO, *Primary Examiner.*